United States Patent
Clark et al.

[11] Patent Number: 5,864,747
[45] Date of Patent: Jan. 26, 1999

[54] DATA BRIDGE

[75] Inventors: Anthony S. Clark, Eagan; Curtis L. Nelson, Excelsior, both of Minn.

[73] Assignee: General Dynamics Information Systems, Inc., Falls Church, Va.

[21] Appl. No.: 701,344

[22] Filed: Aug. 22, 1996

Related U.S. Application Data

[60] Provisional application No. 60/002,747, Aug. 24, 1995.
[51] Int. Cl.⁶ ...................................................... H04N 7/10
[52] U.S. Cl. ............................................. 455/3.2; 370/487
[58] Field of Search ........................... 455/3.2, 6.2, 12.1, 455/400; 370/349, 350, 345, 347, 487, 490, 493

[56] References Cited

U.S. PATENT DOCUMENTS

| | | | |
|---|---|---|---|
| 5,412,416 | 5/1995 | Nemirofsky | 455/3.1 |
| 5,418,782 | 5/1995 | Wasilewski | 455/3.1 |
| 5,583,562 | 12/1996 | Birch et al. | 455/3.1 |
| 5,594,490 | 1/1997 | Dawson et al. | 455/3.2 |
| 5,633,870 | 5/1997 | Gaytan et al. | 370/412 |

*Primary Examiner*—Victor R. Kostak
*Attorney, Agent, or Firm*—Kinney & Lange, P.A.

[57] ABSTRACT

A digital data delivery system which uses satellite broadcasting to deliver digital data along with audio and video signals. Digital data files are divided into packets and combined with audio and video packets in a time-division-multiplexed format. The time-division-multiplexed data is digitally modulated and then uplinked to a satellite transponder. The satellite transponder broadcasts the data to a multiplicity of user stations. The data which are broadcast by the satellite transponder are received by a satellite dish at each user station. Each satellite dish then relays the data to a receiver. The receiver identifies and separates the digital data file packets from the audio and video packets and outputs the digital data file packets to a data output port. A data bridge receives the packets from the data output port, buffers the packets, and converts the packets into a format that can be read by standard commercial I/O cards.

9 Claims, 3 Drawing Sheets

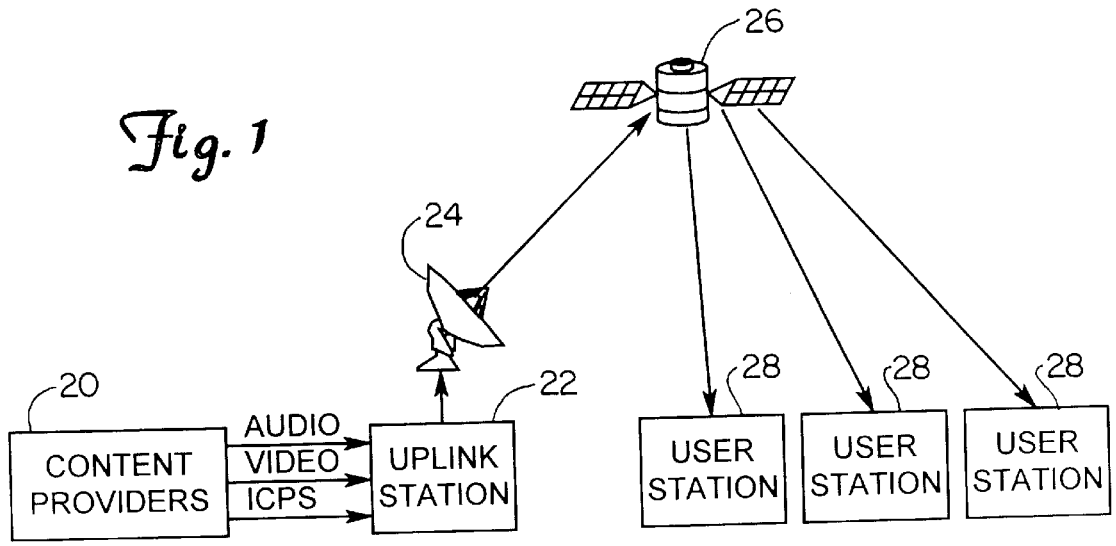
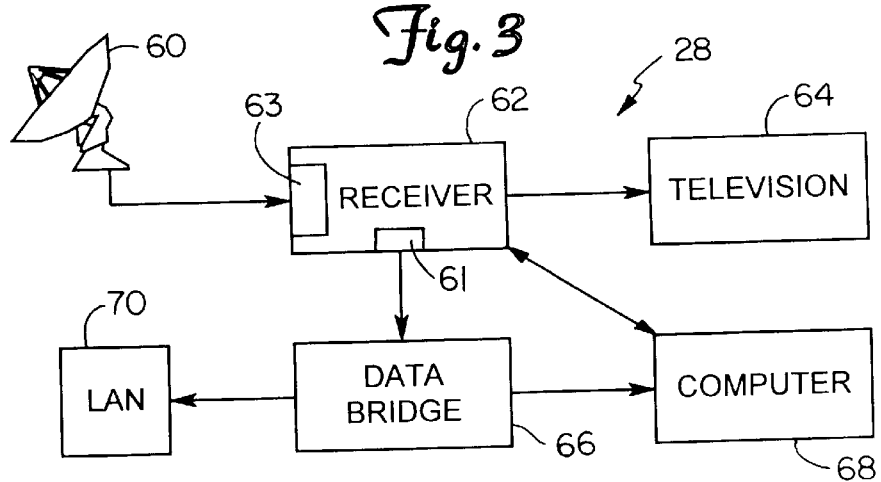
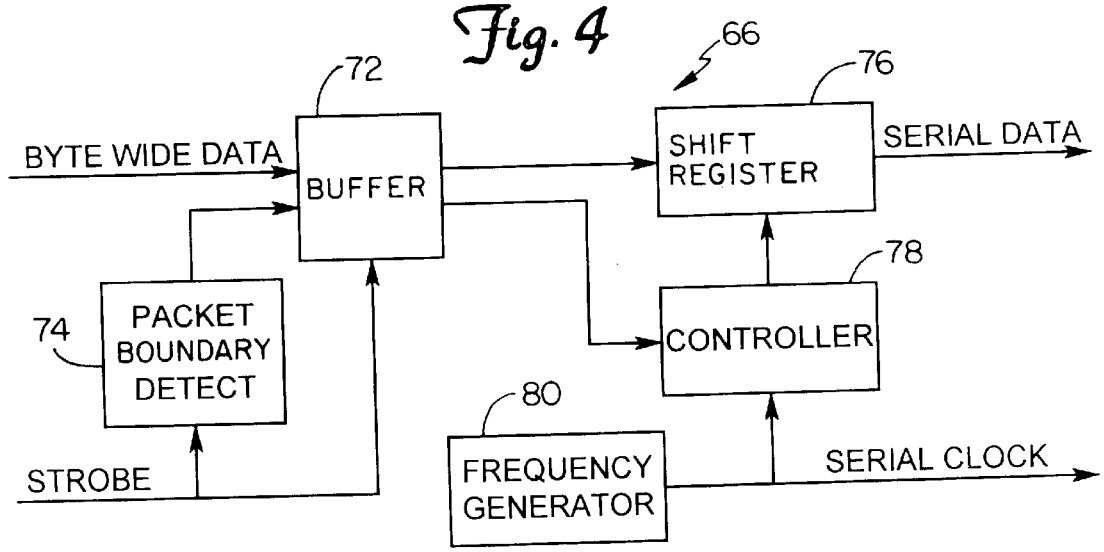

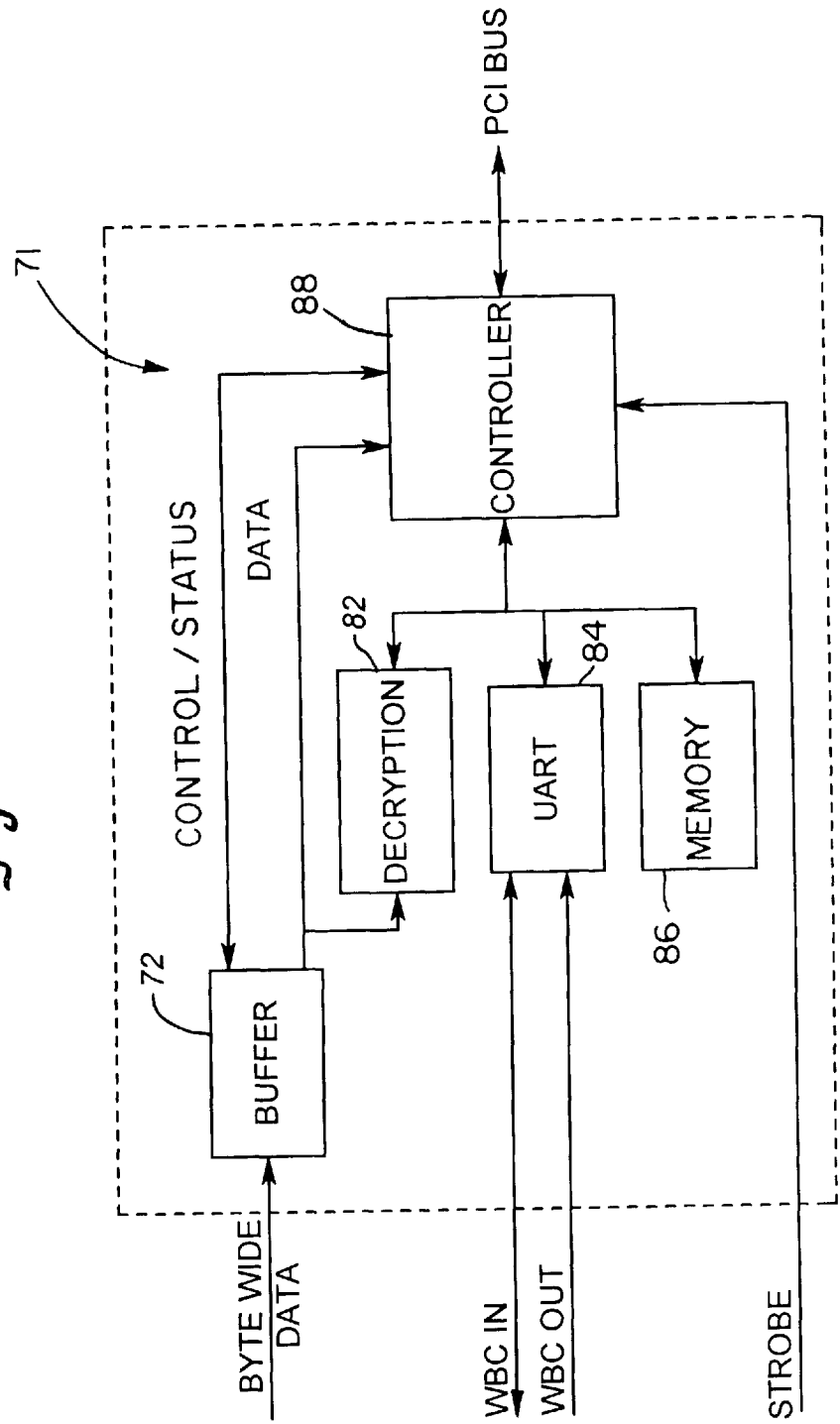

DATA BRIDGE

This application claims the benefit of the filing date of U.S. provisional application Ser. No. 60/002,747 entitled "DATA BRIDGE" which was filed Aug. 24, 1995.

BACKGROUND OF THE INVENTION

The invention relates to a digital data delivery system, and more particularly to a method and apparatus for delivering packetized bursts of data to a computer.

As the popularity of point-to-point, land-based, digital data delivery systems such as the internet increases, the speed of these systems decreases due to the greater traffic. The bandwidth of the data being transferred across land-based digital data delivery systems is also increasing, which further reduces the speed of delivery. In addition, it can be very costly to use standard point-to-point delivery systems to deliver data serially to many points. Thus, it is desirable to provide an alternate means for point-to-multi-point delivery of high bandwidth digital data. It is also desirable to deliver the data using commercial off the shelf communication technologies such as direct broadcast satellite (DBS) technologies in order to reduce the cost of data delivery.

DBS technologies allow reception of audio and video signals via satellite with small satellite dishes having diameters of about 18 inches (45.7 cm). The audio and video signals originate from content providers who submit the signals to an uplink station. The uplink station transmits the signals to a satellite transponder which then broadcasts the signals across a wide region. Each DBS satellite dish receives the broadcasted signals and transfers them to an attached Digital Satellite System (DSS™) receiver. The receiver identifies which signals it is authorized to output, and outputs these signals to a television set. Thus, the DBS system acts much like a broadcast cable television network.

Commercial DSS receivers have a high speed data port called a Wide Band Data Port (WBDP). The WBDP was originally intended for the output of signals for high definition television (HDTV). However, there are currently two drawbacks to the use of HDTV. First, the transmission of HDTV signals requires approximately four times the bandwidth of regular television signals. With its higher quality comes a higher price for the reception of the programming. Second, HDTV receivers cost much more than standard television sets. Moreover, as the picture quality of standard sets becomes increasingly better due to the use of digital technology and other techniques, it is likely that the standard sets will exhibit quality almost as high as HDTV without the higher cost. Therefore, given the initial and recurring cost barriers to the use of HDTV, its future is in doubt.

Since HDTV has not become commercially successful to date, alternate uses for the WBDP are desirable. One such use is for the delivery of digital data to a computer. The WBDP provides a cost effective means for delivering digital data to a computer because it is a standard port on DSS receivers and, therefore, no additional hardware must be added.

A problem arises, however, with using the WBDP for delivering data to a computer, because the output from the WBDP is not in a format that commercial computer I/O cards can understand. The present invention solves this problem by buffering the WBDP output and converting it into a format which can be read by commercial off-the-shelf computer I/O cards. Thus, by adding a data bridge according to the present invention, a DBS system can receive not only audio and video signals, but also digital data such as electronic mail, graphics, multi-media programs, and other digital data streams.

SUMMARY OF THE INVENTION

A satellite broadcasting system broadcasts channels of digital data in packets representing audio, video and computer data. A receiver separates the packets of computer data from the packets of audio and video data. The receiver provides the computer data packets in the form of parallel burst data to a data bridge. A buffer in the data bridge stores the packets of computer data separated by the receiver and intermittently outputs the computer data packets.

In one form of the invention, a shift register receives the computer data output from the buffer and outputs the computer data as a serial data stream. The data bridge can operate in a gapped clock mode, a continuous clock mode, or a variable clock mode.

In the gapped clock mode, data is output from the data bridge using a clock that is faster than the average rate at which the computer data packets were originally transmitted. The clock rate is set slightly higher than the initial transmission rate to ensure that no data is lost.

In the continuous clock mode, the buffer is preferably filled half-way before any data is shifted out. The clock rate is set at the same rate as the average rate at which the computer data packets were originally transmitted. Therefore, data will be output from the data bridge one bit at a time at the same rate as the average rate at which the data was originally transmitted.

In the variable clock mode, the output rate of the date bridge is continuously adjusted based on the status of the buffer.

In a second embodiment of the data bridge, rather than outputting data in a serial stream, data are transferred from the buffer of the data bridge directly into the main memory of a computer via a peripheral component interface (PCI) bus.

In accordance with the invention, a digital data file is transmitted to a computer via a satellite broadcasting system which broadcasts audio, video and data packets to a receiver. The digital data file is divided into digital data file packets and combined with the audio and video packets in a time-division-multiplexed format to create a serial data stream. The serial data stream is digitally modulated and broadcast via the satellite broadcasting system to the receiver. The receiver routes the audio and video packets to an A/V processing subsystem. The digital data file packets are separated from the modulated data stream and output as parallel data bursts to a data output port of the receiver. The digital data file packets from the data output port are stored in a buffer and output to the computer in a serial data stream.

Preferably, unique identification codes for the packets are broadcast by the satellite to identify selected channels. The receiver includes means for identifying channels it is authorized to process based on the identification codes and is responsive to the identifying means to output packets from only the channels it is authorized to process. Also preferably one or more channels are divided into a plurality of sub-channels each having a unique secondary identification code. A memory device includes a lookup table identifying subchannels which the data bridge is authorized to process. The data bridge is responsive to a secondary identification code in a packet and to the lookup table to enable the data bridge to output a packet only if it is from an authorized subchannel.

In the event a channel contains encrypted data, the receiver identifies that the channel is encrypted and decrypts the channel prior to output of the data. In the event a subchannel contains encrypted data, the data bridge identifies that the subchannel is encrypted and decrypts the subchannel prior to output of the data.

BRIEF DESCRIPTION OF THE DRAWINGS

FIG. 1 is a block diagram of the digital data delivery system.

FIG. 3 is a block diagram of a user station used in the digital data delivery system.

FIG. 4 is a block diagram of a first preferred embodiment of the data bridge.

FIG. 5 is a block diagram of a second embodiment of the data bridge.

DETAILED DESCRIPTION OF THE PREFERRED EMBODIMENTS

Figure 2:
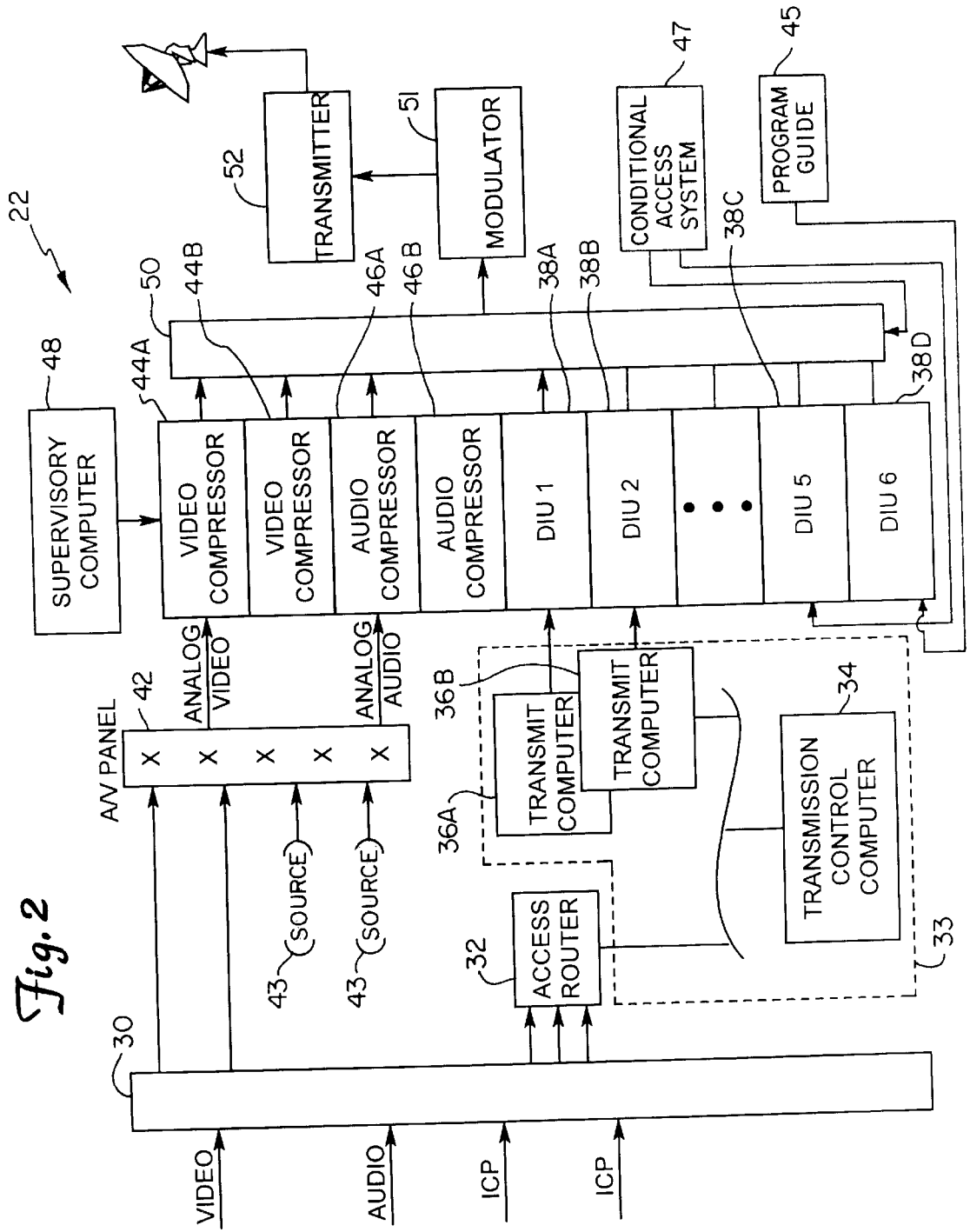
FIG. 2 is a block diagram of a preferred embodiment of the uplink station used in the digital data delivery system.

I. Overview of the Digital Data Delivery System

The present invention is a digital data delivery system which combines digital data files (i.e. information content packages or ICPs) with audio and video signals, and broadcasts the information via satellite on a plurality of service channels to a plurality of user stations. Content providers send the ICPs and the audio and video signals to an uplink station.

At the uplink station, the ICPs and the audio and video signals are divided into packets. The packets are marked with a service channel identification (SCID) number. SCIDs allow individual ICPs, audio signals, or video signals to later be separated by a receiver. Each packet of a particular ICP will be on the same service channel, which is to say that each packet of the ICP will have the same SCID. Selected service channels may be encrypted. Selected service channels may also be divided into subchannels. When subchannels are used, a subchannel designator is added to each packet to indicate which subchannel each packet is associated with. In addition to the first layer of encryption (encryption of an entire service channel), individual subchannels may also be encrypted.

All of the service channels are combined in a time-division-multiplexed format. The time-division-multiplexed data is digitally modulated and then uplinked to a satellite transponder. The satellite transponder broadcasts the data to a plurality of user stations.

The data which is broadcast by the satellite transponder is received by a satellite dish at each user station. Each satellite dish relays the data to an attached receiver. The receiver examines each packet and determines if it is authorized to output the packet. Audio and video packets are output to an A/V processing subsystem, and ICP packets are output to a data output port. The packets from an encrypted service channel are decrypted prior to being output. A data bridge according to the present invention receives the ICP packets from the data output port and stores the packets in a buffer.

FIG. 1 shows a digital data delivery system according to the present invention. The data delivery system consists of content providers 20, uplink station 22, uplink dish 24, satellite transponder 26, and user stations 28.

Content providers 20 send audio and video signals to uplink station 22. Content providers 20 also create information content packages (ICPs) and submit them to uplink station 22. ICPs may be any digital files such as digital video, digital audio, or data files such as documents, engineering data, database information, software programs, or engineering drawings. ICPs can be prepared locally and submitted to uplink station 22, or can be prepared while logged on at the uplink station. Content providers 20 may be connected to uplink station 22 via satellite or landlines (such as T1, Plain Old Telephone System (POTS), Internet, Frame Relay, or Integrated Services Digital Network (ISDN)). ICPs include the actual data being sent, plus delivery addresses and delivery instructions. The delivery addresses identify the intended recipients or groups of recipients of the data. ICPs can be sent to individual user stations, a group of user stations, or the entire set of user stations. The delivery instructions include security information, time of delivery, the number of times the data is to be delivered, and the speed of delivery. ICPs can be scheduled for immediate delivery or delivery at any point in the future.

Uplink station 22 prepares ICPs for transfer to user stations 28. The preparation of ICPs for transfer is discussed in detail below with reference to FIG. 2. When an ICP is ready for transfer, it is transmitted to satellite transponder 26 by uplink dish 24. Satellite transponder 26 then broadcasts the ICP to user stations 28. Satellite transponder 26 is preferably either a direct broadcast satellite (DBS) transponder or a standard Ku-band satellite transponder. Since standard Ku-band transponders produce less power than DBS transponders, a larger downlink dish is needed at each user station to compensate for the weaker signal if standard Ku-band transponders are used. Satellite transponder 26 preferably broadcasts a bandwidth of 40 mega bits per second (Mb/s). In one preferred embodiment, 23 of the 40 Mb/s are used for data, and the other 17 Mb/s are used for error correction. Although only one satellite transponder is shown in FIG. 1, multiple transponders may be used.

II. Detailed Description of Uplink Station 22

FIG. 2 is a block diagram of uplink station 22. Uplink station 22 consists of backhaul termination unit 30, access router 32, local area network (LAN) 33, transmission control computer (TC computer) 34, transmit computers 36, data interface units (DIUs) 38, audio/video (A/V) panel 42, audio and video sources 43, video compressors 44, program guide 45, audio compressors 46, conditional access system 47, supervisory computer 48, multiplexer 50, modulator 51, and transmitter 52.

Audio signals, video signals, and ICPs submitted by content providers 20 (shown in FIG. 1) are received by backhaul termination unit 30. The audio and video signals are then routed to A/V panel 42, and the ICPs are routed to access router 32.

In addition to the audio and video signals originating from content providers 20, audio and video sources 43 also send audio and video signals to A/V panel 42. A/V panel 42 has multiple inputs, multiple outputs, and can route signals from any input to any output. A/V panel 42 routes video signals to video compressors 44 and routes audio signals to audio compressors 46.

The audio and video signals output by A/V panel 42 are analog signals. The analog signals output by A/V panel 42 are received by video compressors 44 and audio compressors 46 and converted into digital data. Compressors 44 and 46 are under the control of supervisory computer 48. The digital audio and digital video data are then compressed by compressors 44 and 46. Compressors 44 and 46 preferably use MPEG 1++ or MPEG2 compression. The compressed data are then divided into packets by compressors 44 and 46. Preferably, each packet consists of 130 bytes.

After the compressed digital audio and digital video data are divided into packets, supervisory computer 48 then adds to each packet a packet header and a service channel identification (SCID) number. A packet header identifies the information content of a packet (e.g., audio, video or data). SCIDs are an integral part of a conditional access scheme. Each packet of a particular audio or video signal, or ICP, has the same SCID number. The conditional access scheme provides a means for restricting access to the packets which are transmitted by uplink station 22. Access to packets is restricted by sending conditional access data to each user station prior to sending the audio or video packets. The conditional access data identifies for each user station, which service channels the user station is authorized to use. The conditional access data also notifies the user stations which service channels are encrypted and which key is required to decrypt these service channels. The conditional access data is generated by conditional access system 47, and is then transmitted to a DIU 38. At the DIU, the conditional access data is divided into packets and prepared for transmission to user stations 28.

Conditional access system 47 also notifies multiplexer 50 which service channels are to be encrypted, and what key should be used to encrypt these service channels. In response, multiplexer 50 encrypts the specified service channels with the specified key.

At each user station 28, several service channels are typically combined to produce one television channel. For example, to produce a typical television channel, a service channel carrying audio signals is combined with a service channel carrying video signals. Program guide 45 informs each user station 28 which service channels are to be combined. Program guide 45 performs this task by sending association data to a DIU 38. The association data is then divided into packets, combined with the other packets, and then transmitted to the user stations 28.

In addition to transmitting audio and video signals to user stations 28, uplink station 22 also transmits ICPs with the audio and video signals. Access router 32 routes ICPs from backhaul termination unit 30 to LAN 33. LAN 33 consists of TC computer 34 and transmit computers 36. All ICPs routed to LAN 33 are stored in a database by TC computer 34. TC computer 34 continuously polls the database containing the ICPs and examines the delivery instructions for each ICP. When the delivery instructions for an ICP indicate that it is time to transmit the data, TC computer 34 causes one of the transmit computers 36 to initiate the transmission.

Prior to sending an ICP, however, conditional access data is transmitted to the user stations 28 notifying each user station whether it is authorized to use the service channel on which the ICP will be transmitted. In generating the conditional access data, conditional access system 47 examines the delivery address information for the ICP that is to be transmitted to determine which user stations are authorized to use the ICP. Notification to individual user stations is possible because each user station has a unique serial number or address. The conditional access data indicates which serial numbers are authorized to use which service channels.

Rather than use an entire service channel to transmit an ICP, an ICP may instead be transmitted on a subchannel of a particular service channel. When a subchannel is used to transmit an ICP, in addition to the conditional access data being sent to user stations 28, authorization signals may also be sent to the user stations. The authorization signals are derived from the delivery address information for the ICP that is to be transmitted, and notify each user station whether it is authorized to use the subchannel on which the ICP will be transmitted. TC computer 34 causes one of the transmit computers 36 to send the authorization signals. The authorization signals may also provide security and error tracking information about the ICP that is to be sent so that the user stations can ensure valid reception.

After the conditional access data and the authorization signals have been sent to the user stations 28, one of the transmit computers 36 retrieves the ICP to be transmitted from the data base, and divides it into groups of 8 packets. Preferably, the transport structure used to transport packets is based on the fixed 130 byte packet structure used in standard Digital Satellite System (DSS™) receivers. Thus, each packet consists of 130 bytes. Each packet of a particular ICP has the same SCID number. If a service channel is divided into subchannels, individual subchannels may be encrypted by transmit computer 36 using a key that is unique to each subchannel, and a subchannel designator is added to each packet indicating which subchannel the packet is associated with. Transmit computer 36 then sends each group of packets of the ICP to an attached DIU 38. While a packet is in the DIU, a packet header provided by supervisory computer 48 is added to the packet. The packet header contains the SCID number and also identifies the packet as an ICP packet.

Multiplexer 50 combines the audio and video packets which are output by compressors 44 and 46 with the ICP packets which are output by DIUs 38. The combined data are output in a serial stream in a time-division-multiplexed format to modulator 51. Thus, if 23 Mb/s of data are being transmitted to user stations 28 (shown in FIG. 1), multiplexer 50 determines how the 23 Mb will be divided among the video packets, audio packets, and ICP packets. Multiplexer 50 also adds time stamps into the serial stream, and encrypts the service channels which it is directed to encrypt by conditional access system 47.

Modulator 51 adds forward error detection/correction data to the data output by multiplexer 50, and then uses quadrature phase shift key modulation to encode the digital data onto a radio frequency carrier. Transmitter 52 shifts the modulated signal to the uplink frequency required by the transponder and then transmits the signal to uplink dish 24. (shown in FIG. 1). Uplink dish 24 uplinks the signal to satellite transponder 26 (shown in FIG. 1). Satellite transponder 26 then shifts the signal to the Ku frequency, and amplifies and broadcasts the signal to user stations 28 (also shown in FIG. 1).

III. Detailed Description of User Station 28

FIG. 3 shows a block diagram of a user station 28. User station 28 includes downlink dish 60, receiver 62, television 64, data bridge 66, computer 68, and local area network (LAN) 70.

Downlink dish 60 receives the Ku-band signal which is broadcast from satellite transponder 26 (shown in FIG. 1). The size of downlink dish 60 is determined by the type of satellite transponder used. If a DBS transponder is used, downlink dish 60 can be an 18 inch (45.7 cm) DBS dish. If satellite transponder 26 is a standard Ku-band satellite transponder, a 0.9 meter or larger dish is preferable. Downlink dish 60 preferably includes a low noise block converter designed to translate the Ku-band signal (11.7–12.2 GHz) down to the L-band (950–1450 MHz). The L-band signal allows use of a coaxial cable to transmit the signal to receiver 62 rather than a wave guide (which is required in the Ku-band region).

Receiver 62 receives the L-band signal which is output from downlink dish 60, and examines the SCID of each packet in the signal. Receiver 62 then outputs only those packets which it is authorized to decode and output. A conditional access card 63 contained in receiver 62 determines which packets the receiver is authorized to output. Conditional access card 63 maintains a table of SCIDs which the receiver is allowed to output. The table of SCIDs also indicates which SCIDs are encrypted and which key is required to decrypt the encrypted SCIDs. The table of SCIDs can be updated by satellite with the conditional access data discussed above.

Receiver 62 is capable of outputting signals only when conditional access card 63 is contained in the receiver. If conditional access card 63 is removed from receiver 62 and placed in a second receiver, the second receiver and not receiver 62 will be able to output signals.

Receiver 62 is preferably a DSS compatible receiver with output ports for the output of television signals, composite video signals, audio signals, and high speed data signals. High speed data signals are output on the wide band data port (WBDP) of a DSS receiver. When receiver 62 receives a packet, the receiver examines the SCID of the packet and determines if it is authorized to output the packet. If the receiver is authorized to output the packet and the packet is from an encrypted service channel, the packet is decrypted prior to being output. The receiver then determines, based on the packet header, which output port the packet is to be output to. If the packet header indicates that the packet is part of an ICP, (i.e. high speed data), the packet is output to WBDP 61.

Signals received by receiver 62 are typically coming in at a rate of 40 Mb/s. In one preferred embodiment, 23 Mb/s of the 40 Mb/s are actual data, with the remaining 17 Mb/s used for error correction and other information (although other ratios may be used depending upon the speed and accuracy desired). Only the actual data is output from the receiver. Thus, the maximum output rate of WBDP 61 is 23 Mb/s. However, the 23 Mb of data output by the receiver each second is typically divided up among audio packets, video packets, and ICP packets. Only the ICP packets are routed to WBDP 61. Thus, only a portion of the 23 Mb output each second will be ICP data. The average rate at which ICP data is transmitted from uplink station 22 (and correspondingly output by the receiver) is set at the uplink station in accordance with the delivery instructions for the ICP. The transmission rate will usually not exceed 1.5 Mb/s. The ICP data is output from WBDP 61, then, in bursts at a rate of 23 Mb/s. Over an extended time, though, the average output rate will not exceed 1.5 Mb/s.

Prior to outputting ICP packets to the WBDP, receiver 62 must be initialized. Receiver 62 preferably has a serial port which allows it to communicate directly with computer 68. Computer 68 can then issue commands to the serial port of receiver 62 to check the signal integrity, to verify the correct configuration of the receiver, and to verify that WBDP 61 is enabled. When initialization of receiver 62 is complete, ICPs can be output to data bridge 66 via WBDP 61.

ICPs are output from WBDP 61 one 8-bit byte at a time. In addition to eight data pins, WBDP 61 also has a strobe pin. Each time the output of the strobe pin transitions from low to high, a new byte of data is output on the eight data pins. The output of the WBDP is usually not continuous. Rather, the data are typically output in parallel bursts at a rate of 23 Mb/s, with gaps in between each burst where no data are output. Data bridge 66 buffers the ICP data from WBDP 61, and then outputs it in a format that can be understood by computer 68 or LAN 70. The operation of the data bridge is discussed in greater detail below with reference to FIGS. 4 and 5.

Computer 68 and LAN 70 maintain a receipt record of validly received ICPs and partially or incorrectly received ICPs. The computer at each user station 28 is preferably connected to uplink station 22 via phone line so that the receipt records can be transferred to the uplink station. From the receipt records, uplink station 22 creates a status log of which user stations 28 validly received ICPs. Content providers 20 preferably have access to the status log to allow verification of ICPs being received by all authorized user stations.

IV. Detailed Description of Data Bridge 66

FIG. 4 is a block diagram of a first preferred embodiment of the data bridge. Data bridge 66 includes buffer 72, packet boundary detect 74, shift register 76, controller 78, and frequency generator 80.

When data enters data bridge 66 from WBDP 61, it is stored in buffer 72. Buffer 72 is preferably a 4K×9 first-in-first-out (FIFO) memory providing 32 K bits of data storage. The strobe pin of WBDP 61 is connected to a write enable input of buffer 72. Thus, each time the strobe pin transitions from low to high, buffer 72 writes the byte of data currently on the eight data pins of WBDP 61 into buffer 72.

Packet boundary detect 74 monitors the strobe pin of WBDP 61 for periods of inactivity. If the strobe pin remains inactive for a pre-defined period of time, packet boundary detect 74 sends a boundary detect signal to buffer 72. Each boundary detect signal is stored in buffer 72, thereby marking the end of each packet.

After data are stored in buffer 72, they are then converted to a serial stream. Controller 78 works in conjunction with shift register 76 and frequency generator 80 to take data from buffer 72 and output them in a serial stream that can be recognized by commercial I/O cards. The serial stream can be based on any standard serial interface such as RS-530, RS-530A, or RS-232.

Data bridge 66 preferably has three modes of operation, a gapped clock mode, a continuous clock mode, and a variable clock mode. The clock signals are provided by frequency generator 80. Frequency generator 80 is preferably an internal frequency synthesizer with switch selectable clocks between 64 KHz and 1.536 MHz in increments of 64 KHz. Preferably, frequency generator 80 also includes a clock which is switch selectable to 0.16% or 1% above the selected rate. Frequency generator 80 may also be configured to produce clocking signals that vary in frequency based on the status of buffer 72. An external clock may also be used to provide a reference frequency so that data bridge 66 can lock to a high accuracy external clock source such as an existing T1 line.

In the gapped clock mode, ICP data is output from buffer 72 using a clock that is slightly faster than the average rate at which the ICP was originally transmitted by the uplink station. In the gapped clock mode, the clock rate of frequency generator 80 is preferably set at either 0.16% or 1% higher than the average rate at which the ICP was originally transmitted. Controller 78 detects when data is stored in buffer 72 and causes one byte of data at a time to be output from buffer 72 to shift register 76. Controller 78 then causes shift register 76 to output one bit of data at a time at the frequency defined by frequency generator 80. When buffer 72 is empty, the clock is stopped until data is again available. The gapped clock mode works well with data that has a definite beginning and ending such as a graphics file or a text file. In these instances, there is no need to match the initial transmission rate and data bridge output rate, so the clock rate is set slightly higher than the initial transmission rate to ensure that no data is lost.

In some applications, it is desirable to regenerate the frequency or average transmission rate at which an ICP was originally transmitted, so that the ICP may be output from the data bridge at the same rate. The continuous clock mode provides this frequency regeneration function. In the continuous clock mode, buffer 72 is preferably filled half-way before any data is shifted out. When controller 78 detects that buffer 72 is half-full, it begins to clock data from buffer 72 into shift register 76. In the continuous clock mode, the clock rate of frequency generator 80 is set at the same rate as the average rate at which the ICP data is originally transmitted by the uplink station. Therefore, controller 78 will cause shift register 76 to output data one bit at a time at the same rate as the average rate at which the ICP was originally transmitted. Data is output at a constant rate until buffer 72 overflows or underflows, at which point buffer 72 is reset and the process begins again. The continuous clock mode works best in situations where a content provider wishes to send a continuous stream of data (such as a live audio or video feed), and the rate at which data is output from the data bridge must match the average rate at which data is transmitted by the uplink station.

In the variable clock mode, the status of buffer 72 is monitored and is used to continuously adjust the clock frequency to match the average data reception rate. If the amount of data in buffer 72 exceeds a predetermined threshold, the clock frequency is increased. If the amount of data in buffer 72 falls below a predetermined threshold, the frequency is decreased.

FIG. 5 shows a second embodiment of the data bridge. Data bridge 71 includes buffer 72, decryption device 82, universal a synchronous receiver transmitter (UART) 84, memory 86, and controller 88. Rather than shifting data out of the data bridge serially like data bridge 66, data bridge 71 transfers data directly into main memory of computer 68 (shown in FIG. 3) via a peripheral component interface (PCI) bus.

When ICP data enters data bridge 71 from WBDP 61, they are stored in buffer 72. Controller 88 examines the first byte of each packet of data stored in buffer 72. The first byte of each packet is preferably a subchannel number. Subchannels provide a means of dividing up service channels (or SCIDs) so that a single service channel can be shared by multiple users. With an 8-bit subchannel designator, there can be up to 256 subchannels per service channel.

Controller 88 compares the subchannel number of each packet with a lookup table of authorized subchannels in memory 86 and determines if the data bridge is authorized to use the packet. The table of authorized subchannels also indicates which subchannels are encrypted, and if encrypted, which key is required to decrypt the data. If a packet is encrypted, the subchannel designator byte remains unencrypted while the other bytes in the packet are encrypted.

If the table of authorized subchannels indicates that data bridge 71 is authorized to use a packet, and also indicates that the packet is encrypted, the packet is output from buffer 72 to decryption device 82 where it is decrypted. Decryption device 82 preferably provides real time Data Encryption Standard (DES) decryption of data using a 64 bit key. The decrypted data is then output to controller 88. If the table of authorized subchannels indicates that data bridge 71 is authorized to use a packet and also indicates that the packet is unencrypted, the packet is output from buffer 72 directly to controller 88. If the table of authorized subchannels indicates that data bridge 71 is not authorized to use a packet, the packet is discarded.

After controller 88 has determined that it is authorized to use various packets, and those packets have been decrypted (if necessary), controller 88 obtains mastership of the PCI bus. Once controller 88 has obtained mastership of the PCI bus, it transfers the packets via the PCI bus into main memory of computer 68 (shown in FIG. 3). Controller 88 monitors the strobe pin of WBDP 61 to detect packet boundaries. Controller 88 marks the packet boundaries prior to transferring the packets to computer 68. Computer 68 reconstructs the original ICP from the packets of data stored in its main memory.

Memory 86 is preferably an EEPROM which stores configuration settings for data bridge 71. One important configuration setting that is stored in memory 86 is the table of authorized subchannels. The table of authorized subchannels can be updated via satellite with the authorization signals discussed above.

Universal a synchronous receiver transmitter (UART) 84 provides an additional means for initializing receiver 62 (shown in FIG. 3). As mentioned above, receiver 62 can be initialized by computer 68 via the serial port of receiver 62. Alternatively, receiver 62 can be initialized via the wide band control (WBC) in pin and WBC out pin of WBDP 61. The WBC pins of WBDP 61 service the same command set as that specified for the serial port of receiver 62.

Although the present invention has been described with reference to preferred embodiments, workers skilled in the art will recognize that changes may be made in form and detail without departing from the spirit and scope of the invention.

What is claimed is:

1. In a satellite broadcasting system in which channels of digital data are broadcast in packets from a satellite and received by a receiver, the data comprising audio program data representing audio program information for parallel processing, video program data representing video program information for parallel processing and computer data representing information for processing by a computer, each packet containing data of one of audio program data, video program data or computer data, the receiver providing outputs in the form of parallel burst data, the parallel burst data including a plurality of data bursts, each data burst being intermittently output from the receiver at a high output rate, a process comprising:

storing the parallel burst data representing the computer data in a buffer;

identifying boundaries between packets of the computer data and storing a boundary identifier in the buffer for each identified boundary; and output the parallel burst data representing the computer data from the buffer to the computer.

2. In a satellite broadcasting system in which channels of digital data are broadcast in packets from a satellite, the data comprising audio program data representing audio program information for parallel processing, video program data representing video program information for parallel processing and computer data representing information for processing by a computer, each packet containing data of one of audio program data, video program data or computer data, the improvement comprising apparatus for transferring the computer data to a computer comprising:

a receiver for receiving the broadcast digital data and providing outputs of packets of audio program data, video program data and computer data in the form of parallel burst data, the parallel burst data including a plurality of data bursts, each data burst being intermittently output from the receiver at a high output rate, the receiver separating the packets of computer data from the packets of audio program data and packets of video program data;

a buffer for storing the packets of computer data separated by the receiver; and a shift register for receiving packets of computer data from the buffer, the shift register transmitting the computer data to the computer in a serial data stream.

3. A method of delivering computer data to a computer via a satellite broadcasting system which broadcasts channels of audio and video packets to a receiver, the receiver routing the audio and video packets to a first output port, the method comprising:

dividing the computer data into digital data packets;

combining the digital data packets with the audio and video packets in a time-division-multiplexed format to create a serial data stream;

digitally modulating the serial data stream to create a modulated data stream;

broadcasting the modulated data stream via the satellite broadcasting system to the receiver;

separating the digital data packets from the modulated data stream;

output the digital data packets in the form of parallel data bursts to a second output port of the receiver, each data burst being intermittently output from the receiver at a high output rate, storing the digital data packets in a buffer;

output the digital data packets from the buffer to a shift register; and output the digital data packets from the shift register to the computer in a serial data stream.

4. The invention of claim 1 wherein the data output to the computer is output on a plurality of bus lines and the computer includes a memory for receiving the data directly from the plurality of bus lines.

5. The invention of either of claims 2–3 wherein the output rate of the shift register is increased when the amount of data stored in the buffer exceeds a first predetermined threshold and the output rate of the shift register is decreased when the amount of data stored in the buffer falls below a second predetermined threshold.

6. The invention of either of claims 2–3 wherein the output rate of the shift register is substantially the same rate as the average rate at which the computer data are originally transmitted.

7. The invention of claim 1 wherein the packets broadcast from the satellite include unique identification codes identifying selected channels, and the receiver includes means for identifying channels it is authorized to process based on the identification codes, the receiver being responsive to the identifying means to output packets of only the channels it is authorized to process.

8. The invention of claim 7 wherein at least one channel is divided into a plurality of subchannels each having a unique secondary identification code, and further comprising a memory device having a lookup table identifying subchannels which the computer is authorized to receive, the buffer or the shift register being responsive to a secondary identification code in a packet and to the lookup table to enable the computer to receive the packet if it is from an authorized subchannel.

9. The invention of claim 1 wherein the receiver determines whether channels of data are encrypted, and the receiver decrypts the channels of data that are encrypted prior to output of the data.

* * * * *